L. B. McCARGAR.
FEED CUTTING MACHINE.
APPLICATION FILED JAN. 31, 1918.
1,277,344.
Patented Aug. 27, 1918.
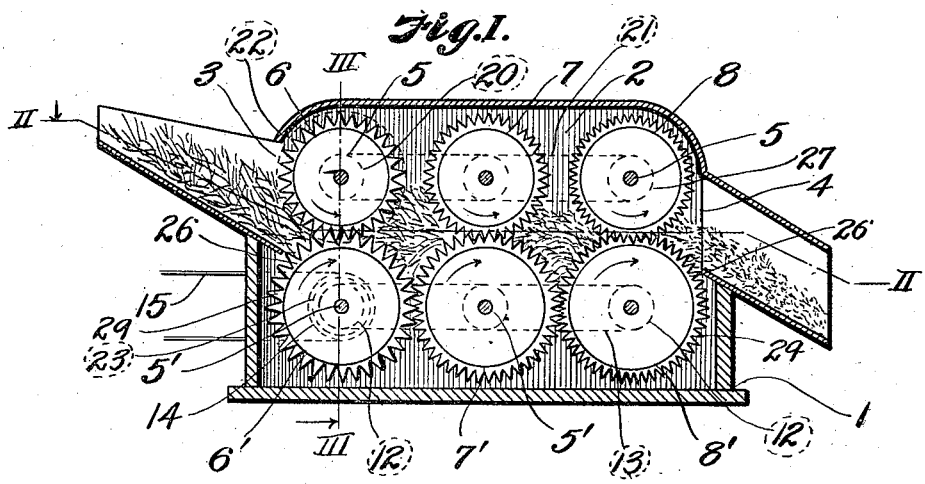
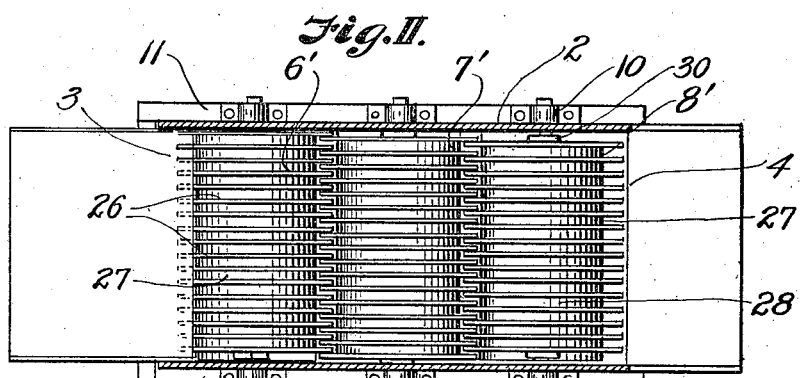
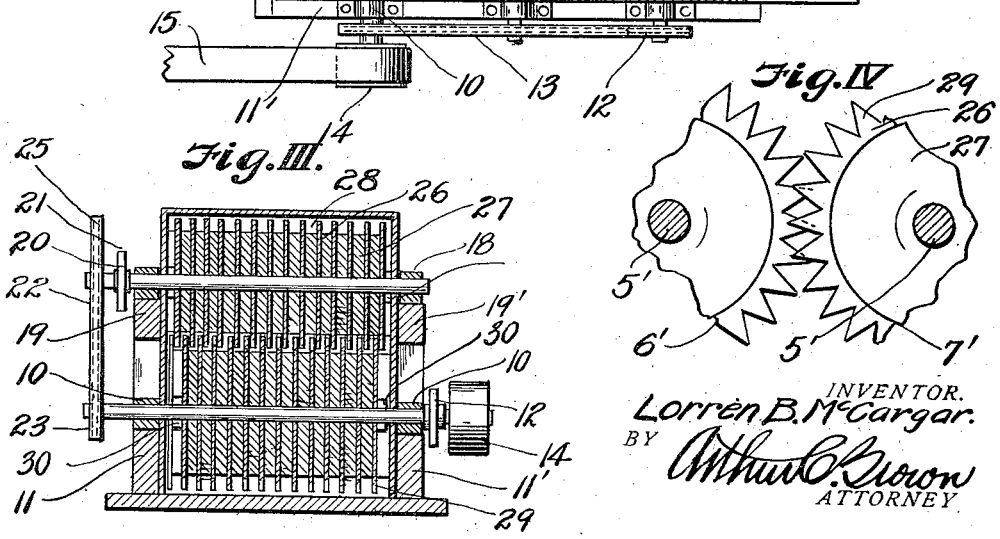
INVENTOR.
Lorren B. McCargar.
BY
Arthur C. Brown
ATTORNEY

UNITED STATES PATENT OFFICE.

LORREN B. McCARGAR, OF KANSAS CITY, MISSOURI.

FEED-CUTTING MACHINE.

1,277,344.

Specification of Letters Patent.

Patented Aug. 27, 1918.

Application filed January 31, 1918. Serial No. 214,593.

*To all whom it may concern:*

Be it known that I, LORREN B. MCCARGAR, a citizen of the United States, residing at Kansas City, in the county of Jackson and State of Missouri, have invented certain new and useful Improvements in Feed-Cutting Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to feed cutting machines and more particularly to machines of that character for cutting and grinding feed such as, alfalfa, corn-stocks, velvet beans or other forage, the principal object of the invention being to provide a machine that will operate successfully without clogging or choking whether the feed be wet or dry and wherein the cutting and grinding members are so arranged that the feed is automatically carried thereby through the machine.

It is a further object of the invention to provide a machine of the present character wherein the cutting cylinders are arranged in pairs which successively receive the feed as it passes through the machine and wherein each pair is adapted to cut or grind the feed to a finer degree than the preceding set, so that the entire work of cutting the material is not placed on the first set of cutters but is distributed equally among all the sets and an evenly cut product may be produced.

In accomplishing these and other objects of the invention, I have provided improved details of structure, the preferred forms of which are illustrated in the accompanying drawings, wherein:—

Figure I is a vertical, longitudinal section of a feed cutting machine constructed according to the present invention.

Fig. II is a horizontal section of the same, on the line II—II, Fig. I.

Fig. III is a transverse vertical section on the line III—III, Fig. I.

Fig. IV is an enlarged side view of two of the cutters, particularly illustrating the overlapped relation of the cutting teeth.

Referring more in detail to the drawings:—

1 designates a feed cutting machine constructed according to the present invention, comprising a housing 2 provided with a front intake opening 3 and a rear discharge opening 4 through which feed is delivered into and discharged from the machine.

Revolubly mounted within the housing on transversely arranged upper and lower shafts 5—5', preferably disposed in paired vertical alinement, are a series of feed cutting cylinders 6—6', 7—7', and 8—8' so arranged that cutting members of the paired cylinders overlap each other to effect the cutting and are so driven that feed delivered into the housing will be taken up by the cylinders of the first pair and so discharged therefrom that it will be taken up by the following pair and will finally be delivered from the machine.

The lower shafts 5' are revolubly mounted at their ends in bearings 10 fixed on longitudinally extending beams 11—11' at the opposite sides of the housing 2 and fixed in alinement on corresponding ends of said shafts are sprocket wheels 12, over which a chain belt 13 is run. Also fixed at one end of the forward shaft is a belt wheel 14 over which a belt 15 is extended to drive the shaft, which by the chain connection simultaneously operates all the lower cutting cylinders in the same direction.

The upper shafts 5, which carry the upper cutting cylinders, are revolubly mounted at their opposite ends in bearings 18 that are fixed on beams 19—19' at opposite sides of the housing and fixed in alinement on these shafts are sprocket wheels 20 over which a chain belt 21 is extended. Also fixed on the forward upper shaft 5 is a sprocket wheel 22, which is in alinement with a relatively smaller sprocket wheel 23 on the forward lower shaft 5' and running on the said sprocket wheels 22 and 23 is a chain belt 25 whereby, when the forward lower shaft 5' is driven by the belt to operate the lower cutting cylinders, the upper shafts 5 are operated to revolve the upper cylinders cooperatively with the lower cylinders to perform the function of the machine.

The arrangement of the gearing is such that the upper cutting cylinders are revolved in opposite direction from the lower cylinders but the cylinders of each pair travel rearwardly and in the same direction at their coöperating cutting surfaces and the lower cylinders are revolved much faster than the upper cylinders so that the cutting teeth, which overlap each other, as is presently described will cut and grind the feed and discharge it rearwardly toward the delivery end of the housing.

Each of the cutting cylinders comprises a plurality of cutter disks 26 which are mounted on and spaced apart on their respective supporting shafts by spacing disks 27 of somewhat smaller diameter, thereby leaving pockets or annular channels 28 between adjacent disks. Each disk 26 is provided about its periphery with teeth 29, preferably square cut and V-shaped and the cylinders are so located and of such diameter that the cutting teeth of each of the upper cylinders are adapted to overlap, and operate between the rows of teeth of the lower cylinders paired therewith so that, with the cylinders traveling at different speeds, the feed will be cut and ground as it is carried between the cylinders.

It is also desired that the teeth of the adjacent lower cylinders overlap each other so that the feed will not be allowed to fall between the cylinders, and the teeth of one cylinder will tend to clean the spaces between the cutting disks of the other cylinders to prevent clogging or choking of the machine.

It is preferred to make the teeth of the first pair of cutting cylinders relatively large and to gradually decrease the size of the teeth of the following sets so that the cutting process is distributed among the different sets and is not placed entirely on the forward sets.

It is also intended to so mount the cutting disks on their driving shafts that they may be easily removed and may be reversed when one side of the teeth becomes dull and the opposite sides of the teeth used before sharpening is necessary. Any suitable means may be employed to tighten the disks together on shafts; the preferred means being to thread nuts 30 onto the shafts at opposite ends of the cylinders which may be tightened against the disks to hold them tightly together and locked to the shafts.

With the device so constructed, in using the same, the feed to be cut, which may be forage of any kind, is fed into the housing through the front opening 3 and is taken up by the revolving disks 5—5'. As the lower disks travel much faster than the upper cutter disks, the feed will be cut to a certain degree of fineness and discharged to the following set of cutters which cut it still finer and pass it on to the last set from which it is discharged through the housing opening 4.

It will be seen that by so arranging the cutters and that by gradually decreasing the size of the teeth of the successive sets of cutting cylinders, the feed may be cut and ground to a desired fineness without placing any unnecessary strain on the first set of cutters.

It is also apparent that by operating the teeth of the different sets in mesh with each other, each cylinder is kept clean by the adjacent cylinders, and wet or damp material may be passed through the machine without damage thereto, by choking or clogging.

While I have shown three sets of cutting cylinders, I do not wish to be limited to this particular number, as it is apparent that more or less may be used, according to the degree of fineness that it is desired to give the material passed therethrough.

Having thus described my invention, what I claim as new therein and desire to secure by Letters-Patent, is:—

1. A feed cutting machine including a casing having an inlet at one end and an outlet at the other end, a lower series of cutting cylinders, an upper series of mating cylinders, said cylinders being provided at intervals with cutter disks having projecting peripheral teeth progressively increasing in fineness from the said inlet to the outlet and the disks of the upper cylinders being spaced apart and the disks of the lower cylinders overlapping with each other and with the disks of the mating upper cylinders, said cylinders being arranged to carry the material through the machine and gradually reduce the material in its passage from the inlet to the outlet, and means for rotating the upper and lower cylinders.

2. A feed cutting machine including a casing having an inlet at one end and an outlet at the other end, a lower series of cutting cylinders, an upper series of mating cylinders, said cylinders being provided at intervals with cutter disks having projecting peripheral teeth progressively increasing in fineness from the said inlet to the outlet and the disks of the upper cylinders being spaced apart and the disks of the lower cylinders overlapping with each other and with the disks of the mating upper cylinders, said cylinders being arranged to carry the material through the machine and gradually reduce the material in its passage from the inlet to the outlet, and means for rotating the said cylinders at a greater rate of speed than its co-acting lower cylinder.

In testimony whereof I affix my signature.

LORREN B. McCARGAR.

Copies of this patent may be obtained for five cents each, by addressing the "Commissioner of Patents, Washington, D. C."